(12) United States Patent
Kuo

(10) Patent No.: US 9,909,343 B2
(45) Date of Patent: Mar. 6, 2018

(54) ADAPTABLE LOCK MOUNTING DEVICE

(71) Applicant: Li-Hsin Kuo, Tainan (TW)

(72) Inventor: Li-Hsin Kuo, Tainan (TW)

( * ) Notice: Subject to any disclaimer, the term of this patent is extended or adjusted under 35 U.S.C. 154(b) by 0 days.

(21) Appl. No.: 15/293,719

(22) Filed: Oct. 14, 2016

(65) Prior Publication Data
US 2018/0030761 A1    Feb. 1, 2018

(30) Foreign Application Priority Data

Jul. 27, 2016   (TW) .............................. 105211356 U

(51) Int. Cl.
| | | |
|---|---|---|
| *B62J 11/00* | (2006.01) | |
| *E05B 79/02* | (2014.01) | |
| *E05B 67/38* | (2006.01) | |

(52) U.S. Cl.
CPC ............... *E05B 79/02* (2013.01); *B62J 11/00* (2013.01); *E05B 2067/386* (2013.01)

(58) Field of Classification Search
CPC .......... B62J 11/00; E05B 71/00; E05B 67/38; E05B 79/02; E05B 2067/386; B62H 2005/008
USPC ....... 224/448, 567, 571, 242, 459, 454, 441, 224/902
See application file for complete search history.

(56) References Cited

U.S. PATENT DOCUMENTS

| | | | | |
|---|---|---|---|---|
| 4,896,806 A | * | 1/1990 | Sanchez, Jr. ........... | A01K 97/10 224/200 |
| 5,386,961 A | * | 2/1995 | Lu ............................ | B62H 5/00 224/425 |
| 5,573,164 A | * | 11/1996 | Law .......................... | B60R 7/06 224/277 |
| 5,653,365 A | * | 8/1997 | Lee .......................... | B62H 5/00 224/445 |
| 5,687,942 A | * | 11/1997 | Johnson .................... | F16B 3/00 248/223.41 |
| 8,087,558 B2 | * | 1/2012 | Tsai .......................... | B62H 5/00 224/425 |
| 9,022,373 B2 | * | 5/2015 | Muramatsu .............. | G12B 5/00 269/55 |

\* cited by examiner

*Primary Examiner* — Adam Waggenspack
(74) *Attorney, Agent, or Firm* — Rosenberg, Klein & Lee

(57) ABSTRACT

An adaptable lock mounting device featuring adaptability and flexibility of use is configured to couple with a vehicle frame and includes a mounting base to detachably couple with a coupling base or an assembly base as appropriate, wherein the coupling base is different from the assembly base. A portion of the mounting base is one of a sliding block and a corresponding sliding sleeve to be fitted around the sliding block, while each of a portion of the coupling base and a portion of the assembly base is the other of the sliding block and the corresponding sliding sleeve.

6 Claims, 14 Drawing Sheets

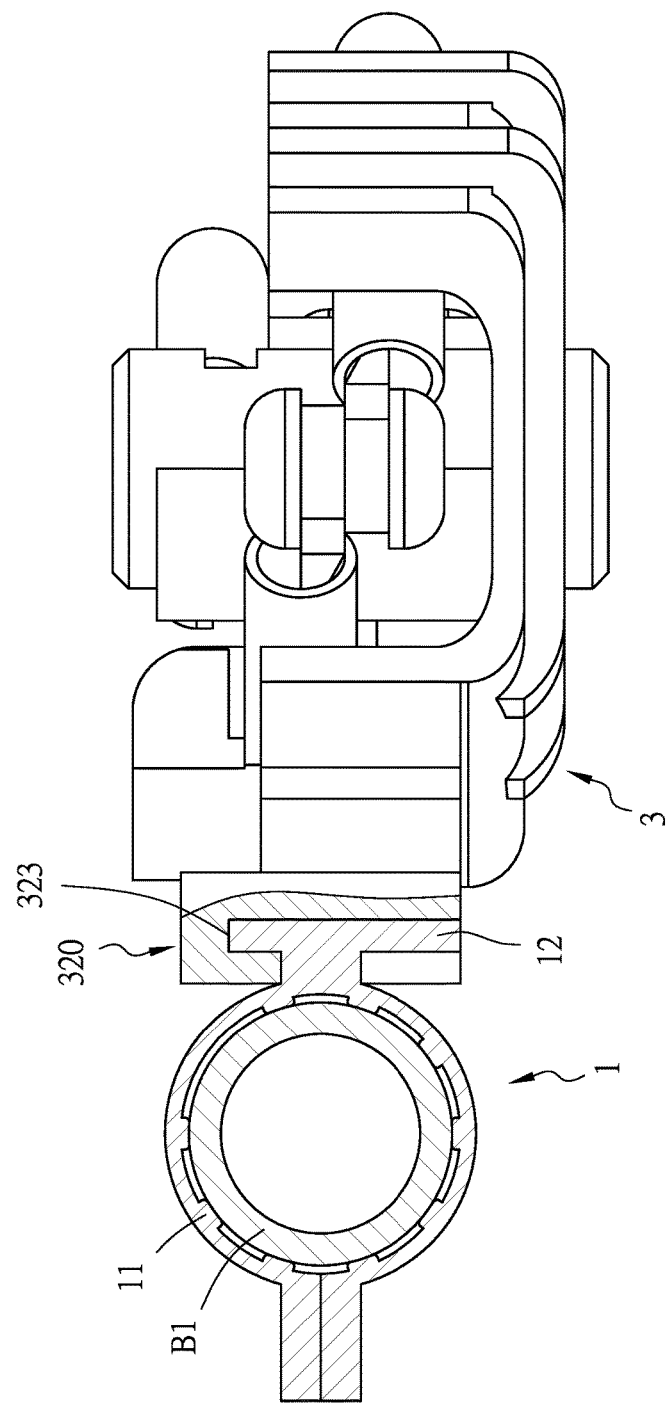
F I G . 3B

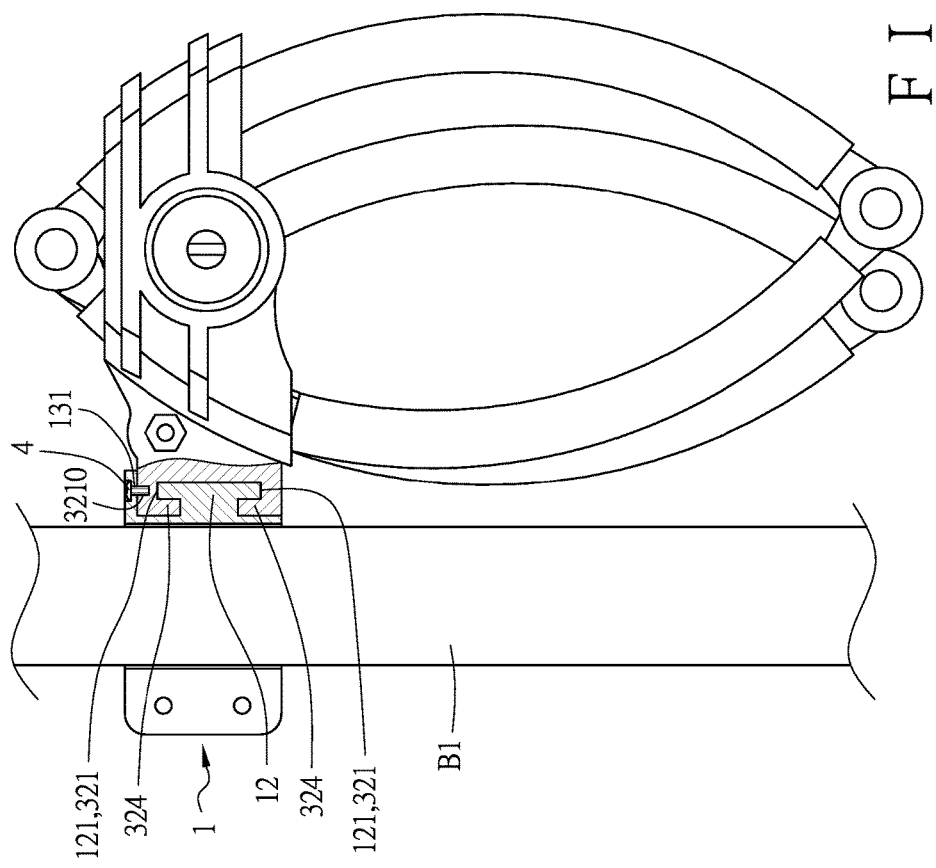

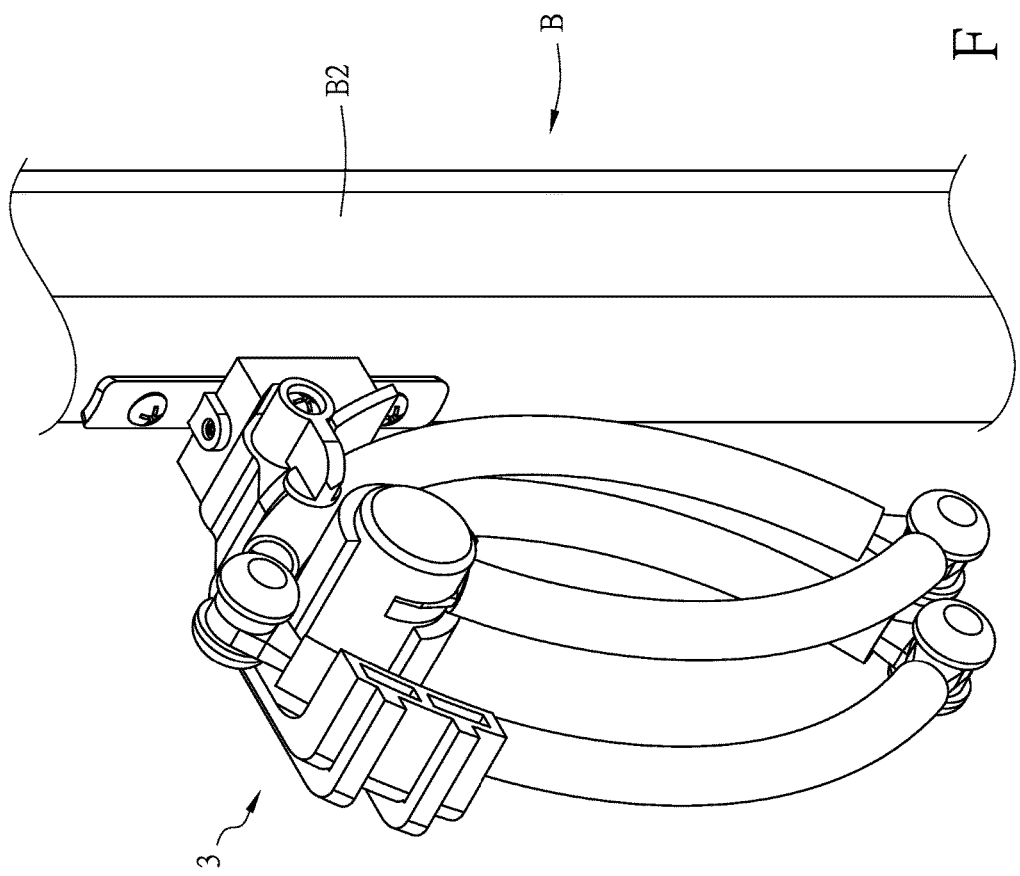

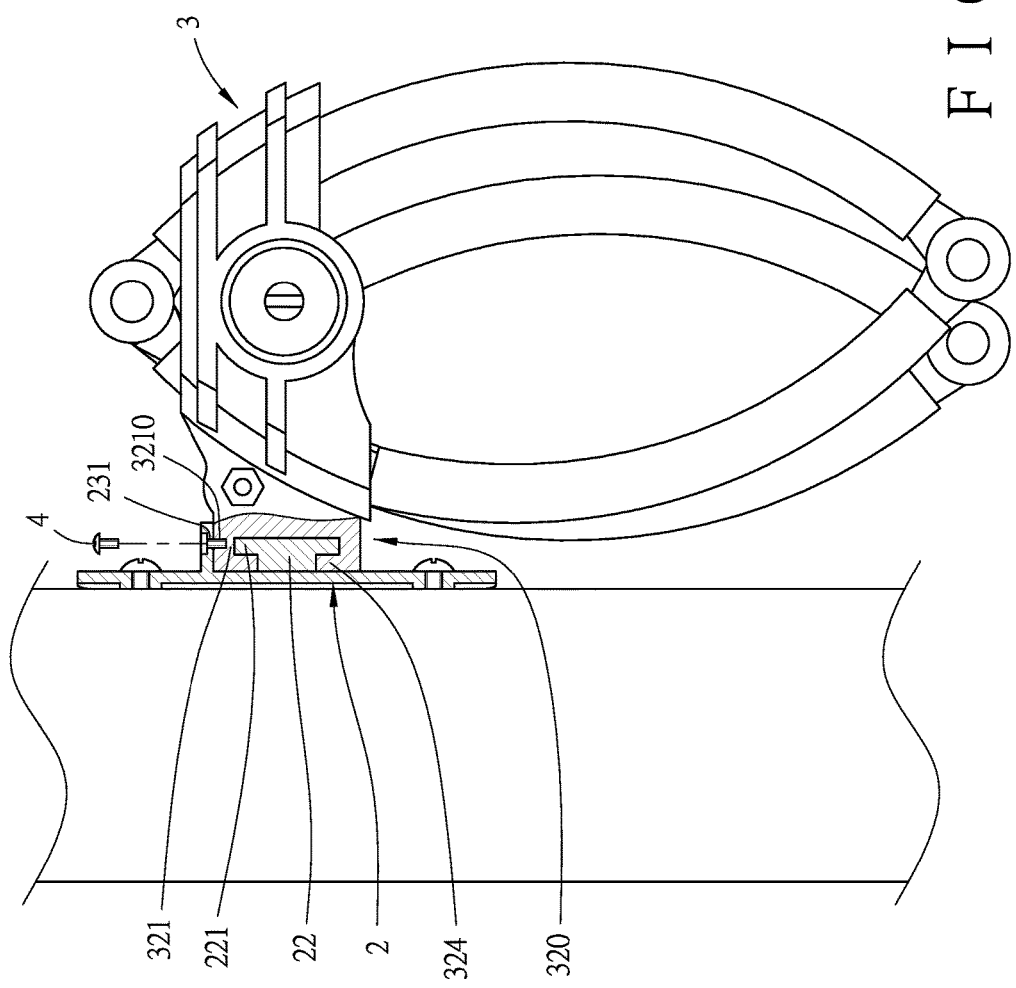

ADAPTABLE LOCK MOUNTING DEVICE

BACKGROUND OF THE INVENTION

1. Technical Field

The present invention relates to a mounting device and more particularly to an adaptable lock mounting device configured to be mounted with a lock.

2. Description of Related Art

There are many auxiliary locks for use with vehicles, including, for example, folding locks and curved-sectioned locks (as disclosed in Taiwan Patent No. 229678, entitled "transformable sectioned lock with curved members"). Related products include the "lock mounting device" disclosed in Taiwan Patent No. M509758.

The afore-cited lock mounting device has a coupling member of a single configuration and therefore is applicable only to a specific portion of a vehicle frame or to vehicle frames of a particular specification. In other words, the lock mounting device has limited applications and lacks flexibility in terms of mounting. From a consumer's point of view, such a product is inconvenient to use; from a manufacturer's perspective, different molds must be designed in order to make products of different specifications, which leads to a high production cost and hinders reduction in product price.

BRIEF SUMMARY OF THE INVENTION

In view of the above, the inventor of the present invention provides an adaptable lock mounting device featuring high adaptability. The adaptable lock mounting device is configured to be mounted with a lock and couple with a vehicle frame, wherein the lock includes a lock cylinder and a keyhole in the lock cylinder. The adaptable lock mounting device includes a coupling base, a mounting base, and a fixing member. The coupling base includes a first coupling portion and a second coupling portion. The first coupling portion is a tubular portion configured to be fixedly mounted around a tubular portion of the vehicle frame. The mounting base includes a lock mounting portion and a linking portion. The lock mounting portion includes a fitting portion and an aperture in the fitting portion. The fitting portion is configured to be fitted around the lock cylinder such that the aperture corresponds to the keyhole. The linking portion is one of a sliding block and a corresponding sliding sleeve to be fitted around the sliding block, and the second coupling portion of the coupling base is the other of the sliding block and the corresponding sliding sleeve, in order for the mounting base to couple with the coupling base via the linking portion in a detachable manner. The fixing member is configured to connect the mounting base and the coupling base in a detachable manner.

Preferably, the second coupling portion is the sliding block while the linking portion is the sliding sleeve.

Preferably, the coupling base has a first coupling hole, the mounting base has a second coupling hole corresponding to the first coupling hole, and the fixing member is configured to pass through the first coupling hole and the second coupling hole.

Preferably, the lock mounting portion includes two position-limiting portions and a lateral portion. The position-limiting portions are located on two sides of the lateral portion respectively, and the fitting portion is located at the lateral portion, such that a mounting space and an opening are defined between the position-limiting portions and the lateral portion. The mounting space is configured to be mounted with the lock. The opening corresponds to the lateral portion and is in communication with the mounting space. The direction in which the lateral portion and the opening extend is defined as a withdrawal direction. It is also preferable that a position-limiting member is movably connected to the lock mounting portion and corresponds to the opening.

Preferably, the position-limiting member has one end pivotally connected to the mounting base and another end corresponding to the lock.

The present invention also provides an adaptable lock mounting device configured to couple with a vehicle frame and including an assembly base in addition to the aforesaid mounting base and fixing member. The assembly base includes a third coupling portion and a fourth coupling portion. The third coupling portion has a plurality of coupling holes, each allowing passage of a coupling member in order for the coupling member to be locked to the vehicle frame. The linking portion of the mounting base is one of a sliding block and a corresponding sliding sleeve to be fitted around the sliding block, and the fourth coupling portion of the assembly base is the other of the sliding block and the corresponding sliding sleeve, in order for the mounting base to couple with the assembly base via the linking portion in a detachable manner. The fixing member is configured to connect the mounting base and the assembly base in a detachable manner.

Preferably, the fourth coupling portion of the assembly base is the sliding block while the linking portion is the sliding sleeve.

Preferably, the assembly base has a first coupling hole, the mounting base has a second coupling hole corresponding to the first coupling hole, and the fixing member is configured to pass through the first coupling hole and the second coupling hole.

The foregoing technical features have the following advantageous effects:

1. The lock mounting device features adaptability and flexibility in terms of assembly because the mounting base can be assembled to the coupling base or the assembly base as needed. In addition, the sliding block and the corresponding sliding sleeve (or sliding groove) facilitate assembly and detachment.

2. Once the mounting base is detachably assembled to the coupling base or the assembly base, the fixing member can be passed through the first coupling hole and the second coupling hole to position the mounting base effectively and prevent the mounting base from getting loose.

3. The position-limiting member serves to block the lock so that the lock will not separate from the mounting base.

BRIEF DESCRIPTION OF THE SEVERAL VIEWS OF THE DRAWINGS

FIG. 3B is a sectional top view showing the embodiment in FIG. 1 mounted on a vehicle frame via the coupling base;

FIG. 4B is a sectional side view showing the embodiment in FIG. 1 mounted on a vehicle frame via the coupling base;

FIG. 5 is a perspective view showing the embodiment in FIG. 1 mounted on a vehicle frame via the assembly base;

FIG. 8A is an exploded sectional side view showing how the embodiment in FIG. 1 is mounted to a vehicle frame via the assembly base.

DETAILED DESCRIPTION OF THE INVENTION

The present invention incorporates the foregoing technical features into an adaptable lock mounting device, whose major effects are detailed as follows.

Figure 1:
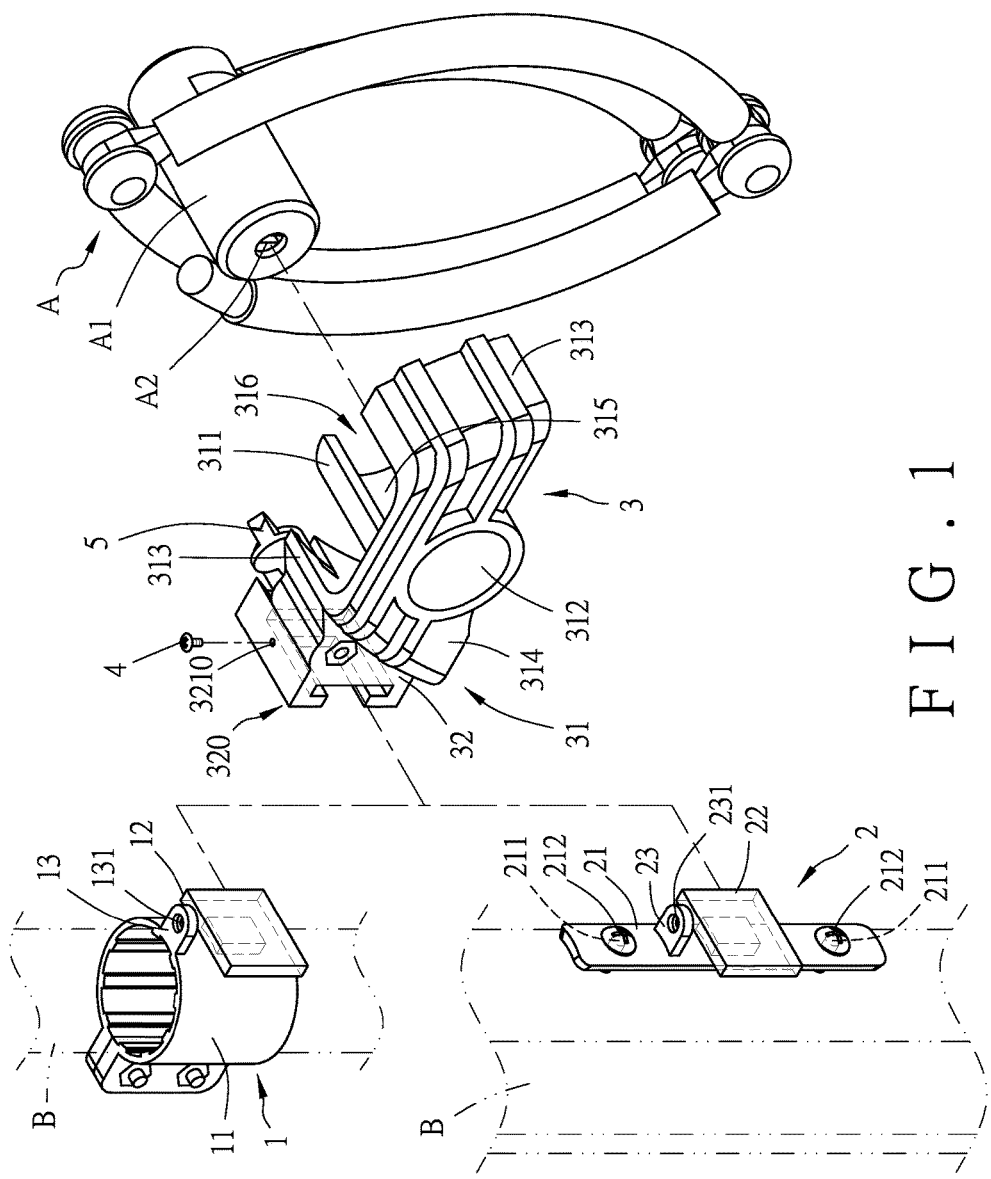
FIG. 1 is an exploded perspective view of an embodiment of the present invention.

Referring to FIG. 1, the adaptable lock mounting device in an embodiment of the present invention is configured to be mounted with a lock A and couple with a vehicle frame B. The lock A includes a lock cylinder A1 and a keyhole A2 in the lock cylinder A1. The adaptable lock mounting device includes a coupling base 1, an assembly base 2, a mounting base 3, and a fixing member 4.

The coupling base 1 includes a first coupling portion 11 and a second coupling portion 12. The first coupling portion 11 is a tubular portion configured to be fixedly mounted around a tubular portion of the vehicle frame B. The assembly base 2 includes a third coupling portion 21 and a fourth coupling portion 22. The third coupling portion 21 has a plurality of coupling holes 211. A plurality of coupling members 212 can pass through the coupling holes 211 respectively and be fixed to the vehicle frame B. In this embodiment, the second coupling portion 12 and the fourth coupling portion 22 are sliding blocks but are not necessarily so; they may be sliding sleeves instead.

Figure 1A:
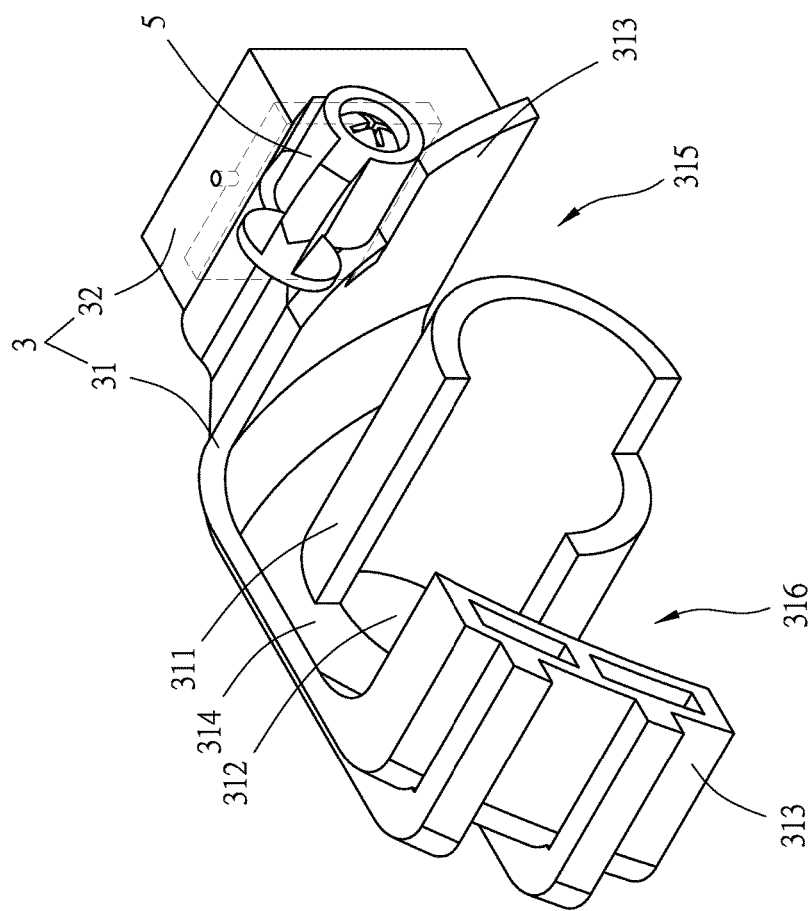
FIG. 1A is a perspective view of the mounting base in FIG. 1 but is taken from a different viewpoint.

With continued reference to FIG. 1, the mounting base 3 includes a lock mounting portion 31 and a linking portion 32. The lock mounting portion 31 includes a fitting portion 311 and an aperture 312 in the fitting portion 311. The fitting portion 311 is configured to be fitted around the lock cylinder A1 such that the aperture 312 corresponds to the keyhole A2. More specifically, referring to FIG. 1 and FIG. 1A, the lock mounting portion 31 further includes two position-limiting portions 313 and a lateral portion 314. The position-limiting portions 313 tilt toward each other and are located on two opposite sides of the lateral portion 314 respectively. Also, the fitting portion 311 is located at the lateral portion 314. Consequently, a mounting space 315 and an opening 316 are defined between the position-limiting portions 313 and the lateral portion 314. The mounting space 315 is configured to be mounted with the lock A. The opening 316 corresponds to the lateral portion 314 and communicates with the mounting space 315. The direction in which the lateral portion 314 and the opening 316 extend is defined as a withdrawal direction. Preferably, a position-limiting member 5 is further included, is movably (e.g., pivotally) connected to the lock mounting portion 31, and corresponds to the opening 316 in order to block the lock A.

Figure 1B:
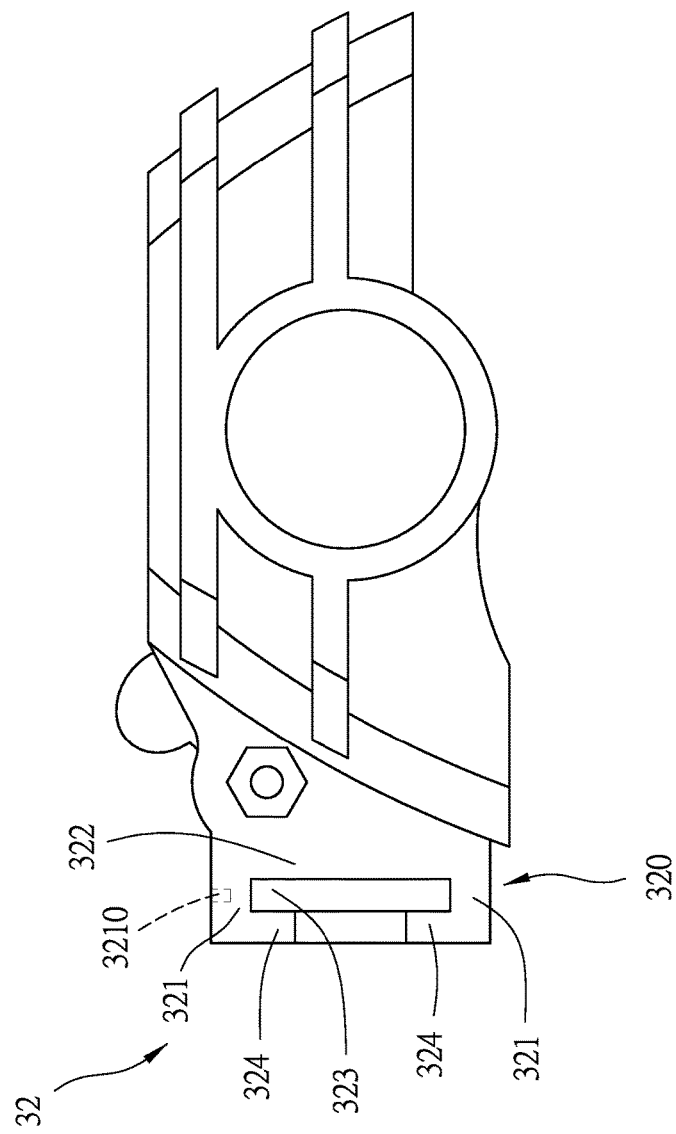
FIG. 1B is a plan view of the mounting base in FIG. 1A.

As shown in FIG. 1 and FIG. 1B, the linking portion 32 in this embodiment includes a sliding sleeve 320 but may include a sliding block instead. In the latter case, the second coupling portion 12 and the fourth coupling portion 22 should be configured as sliding sleeves corresponding to the sliding block. More specifically, the sliding sleeve 320 includes a pair of sidewalls 321 and a connecting portion 322 connecting the sidewalls 321 such that a sliding groove 323 is defined between the sidewalls 321 and the connecting portion 322. Each sidewall 321 may be further extended with an engaging portion 324 opposite the connecting portion 322 in order to block the second coupling portion 12 or fourth coupling portion 22 in the sliding groove 323. Preferably, the sidewalls 321 have a first coupling hole 3210, the coupling base 1 further includes a positioning portion 13 and a second coupling hole 131, and the assembly base 2 further includes a positioning portion 23 and a second coupling hole 231. The positioning portions 13 and 23 correspond to the sidewalls 321. The second coupling holes 131 and 231 are located in the positioning portions 13 and 23 respectively so that the fixing member 4 can pass through the first coupling hole 3210 and the second coupling hole 131 or 231. It should be pointed out that the first coupling hole 3210 may be directly provided in the sliding sleeve 320, and that the second coupling holes 131 and 231 may be directly provided in the second coupling portion 12 and the fourth coupling portion 22 respectively. With either arrangement, the mounting base 3 can be fixed to the coupling base 1 or the assembly base 2 just as well.

Figure 2:
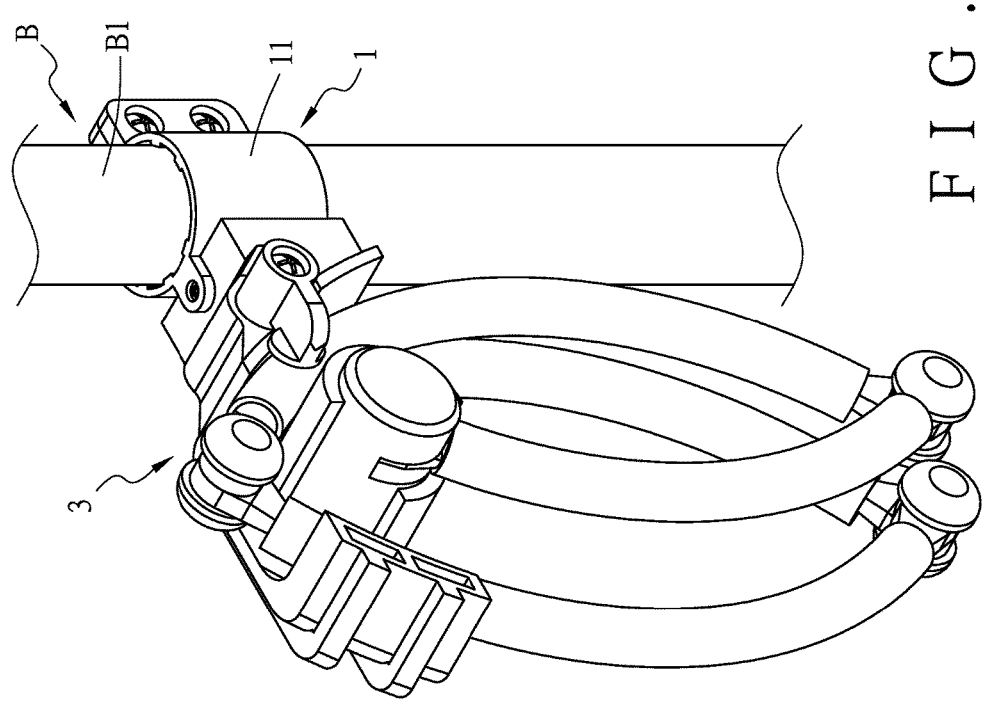
FIG. 2 is a perspective view showing the embodiment in FIG. 1 mounted on a vehicle frame via the coupling base.
Figure 3A:
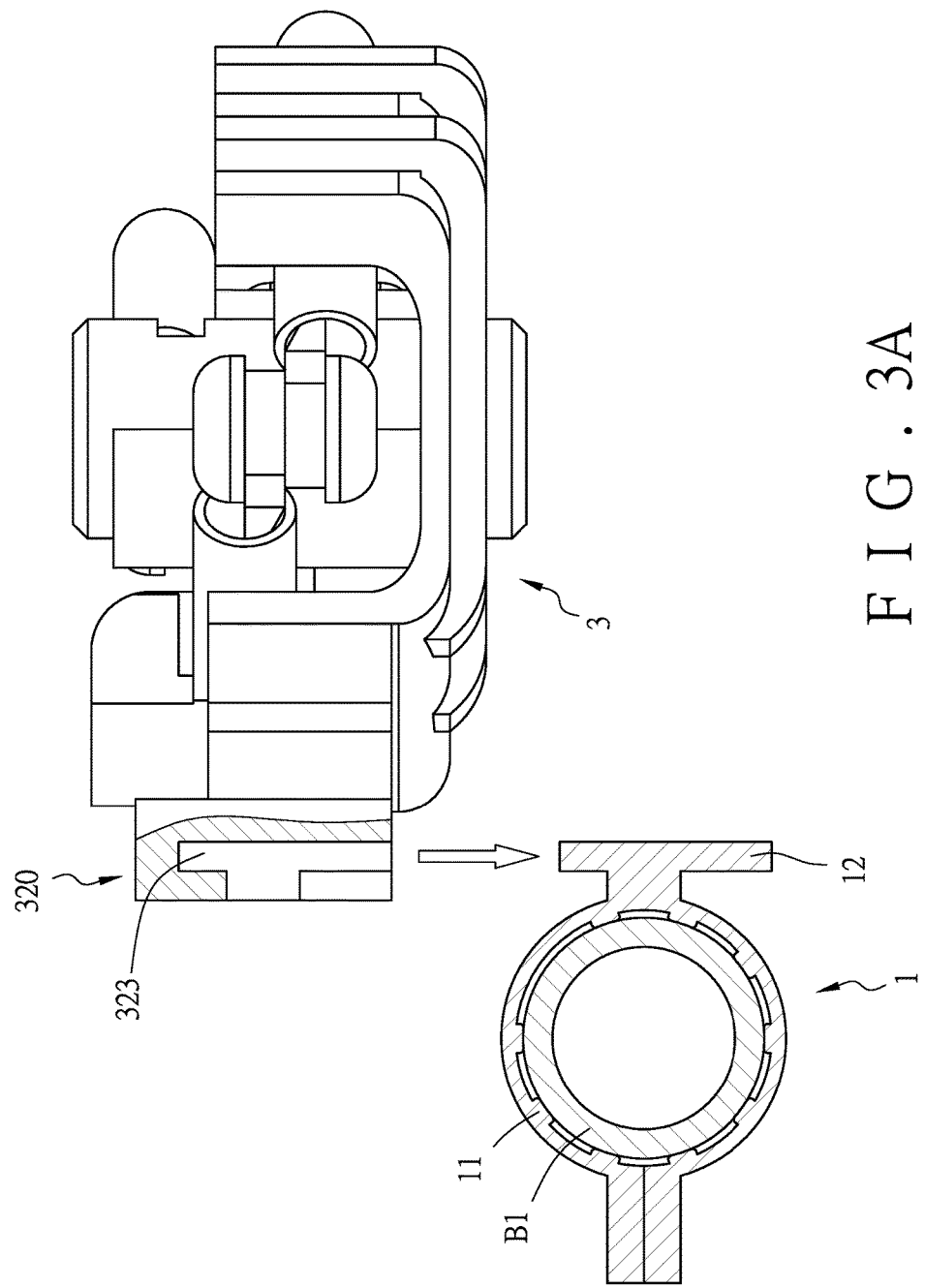
FIG. 3A is an exploded sectional top view showing how the embodiment in FIG. 1 is mounted to a vehicle frame via the coupling base.
Figure 4A:
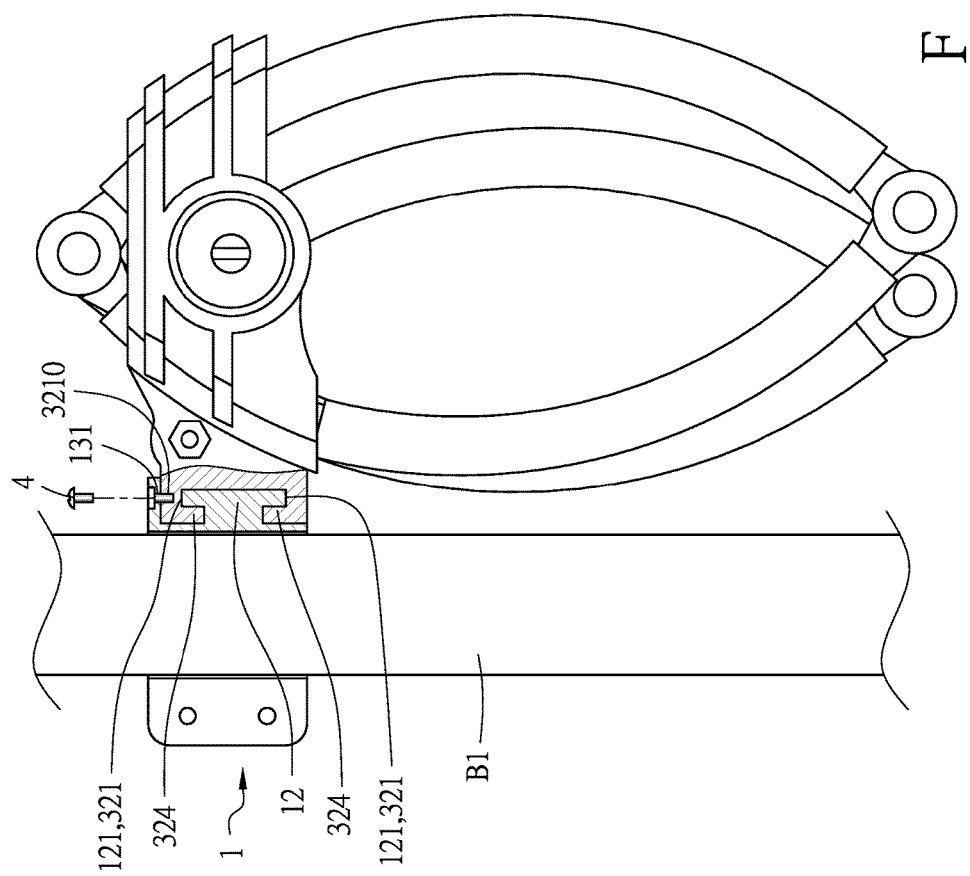
FIG. 4A is an exploded sectional side view showing how the embodiment in FIG. 1 is mounted to a vehicle frame via the coupling base.

In terms of use, referring to FIG. 2, a user may mount the mounting base 3 to a cylindrical bar B1 of the vehicle frame B as follows. The mounting process begins by fixedly mounting the first coupling portion 11 of the coupling base 1 around the bar B1, as shown in FIG. 3A and FIG. 3B. Then, the sliding groove 323 of the sliding sleeve 320 of the mounting base 3 is mated with the second coupling portion 12 of the coupling base 1 in a sliding manner. As a result, referring to FIG. 4A and FIG. 4B, two opposite sides 121 of the second coupling portion 12 (which is implemented as a sliding block in this embodiment) correspond to the sidewalls 321 of the sliding sleeve 320 respectively, and the second coupling portion 12 is blocked by the engaging portions 324 of the linking portion 32. Moreover, the first coupling hole 3210 of the mounting base 3 is aligned with the second coupling hole 131 of the coupling base 1, allowing the fixing member 4 (e.g., a threaded locking member or a pin) to pass through the first coupling hole 3210 and the second coupling hole 131, thereby fixing the mounting base 3 to the coupling base 1 securely.

Figure 6:
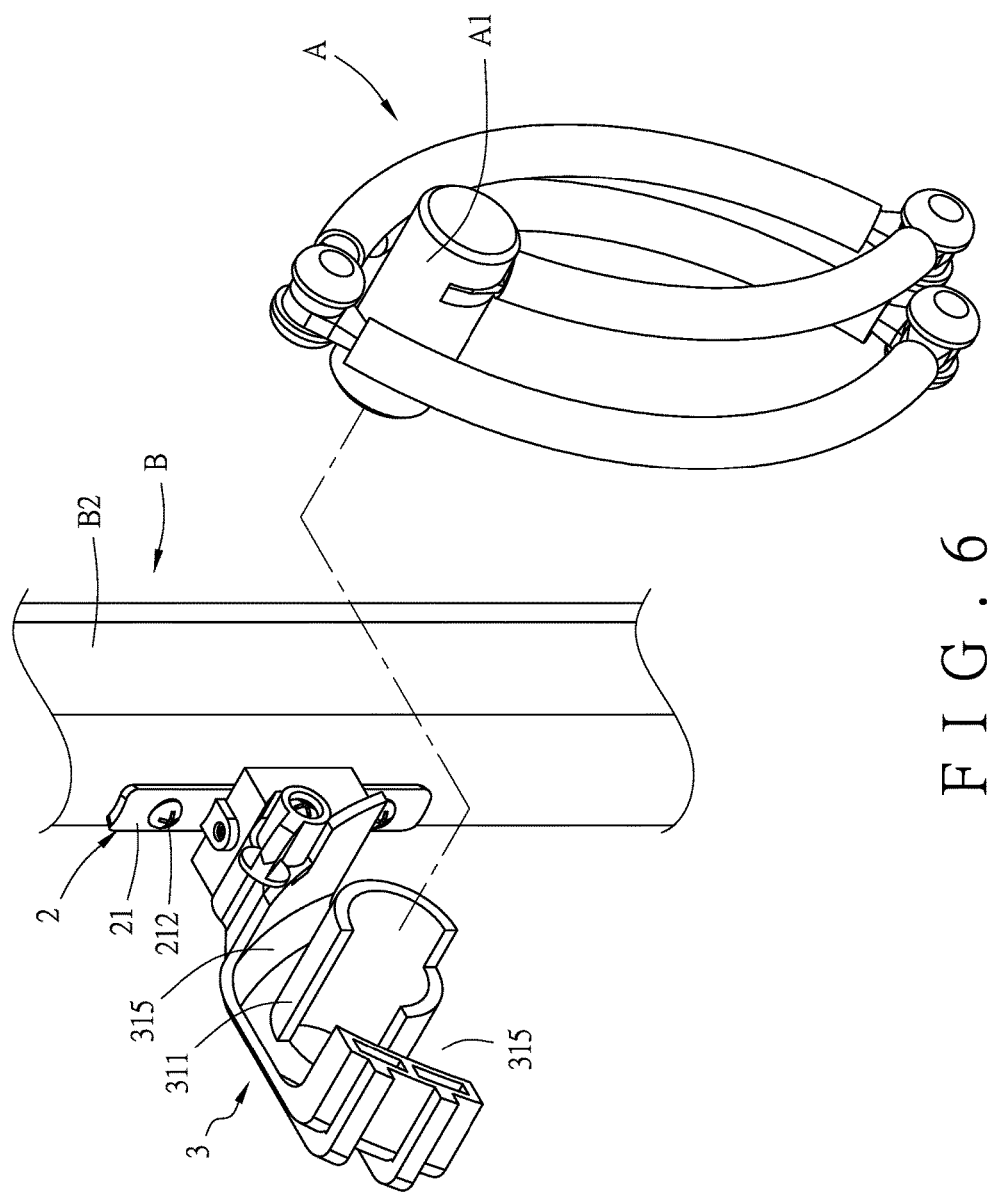
FIG. 6 is an exploded perspective view showing how the embodiment in FIG. 1 is mounted to a vehicle frame via the assembly base.
Figure 7A:
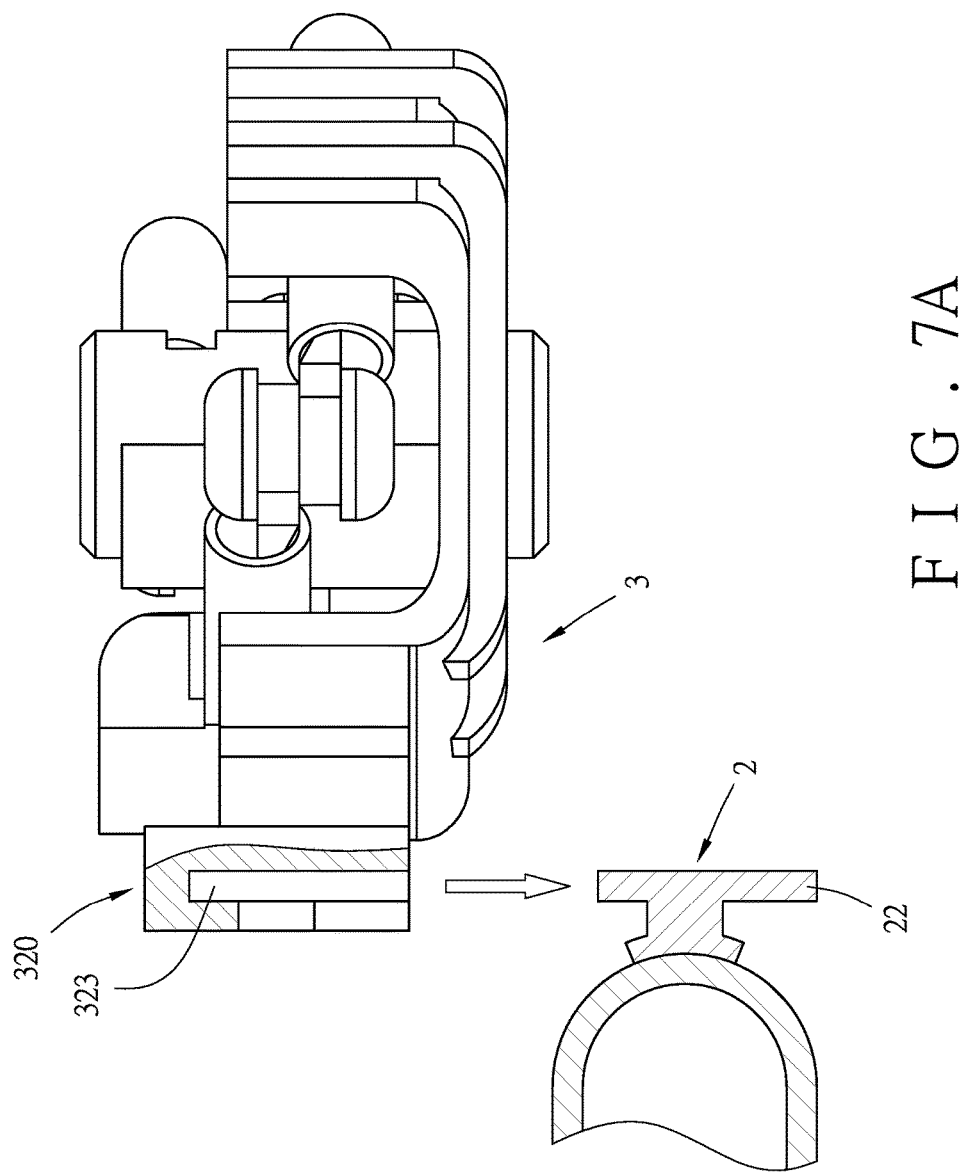
FIG. 7A is an exploded sectional top view showing how the embodiment in FIG. 1 is mounted to a vehicle frame via the assembly base.
Figure 7B:
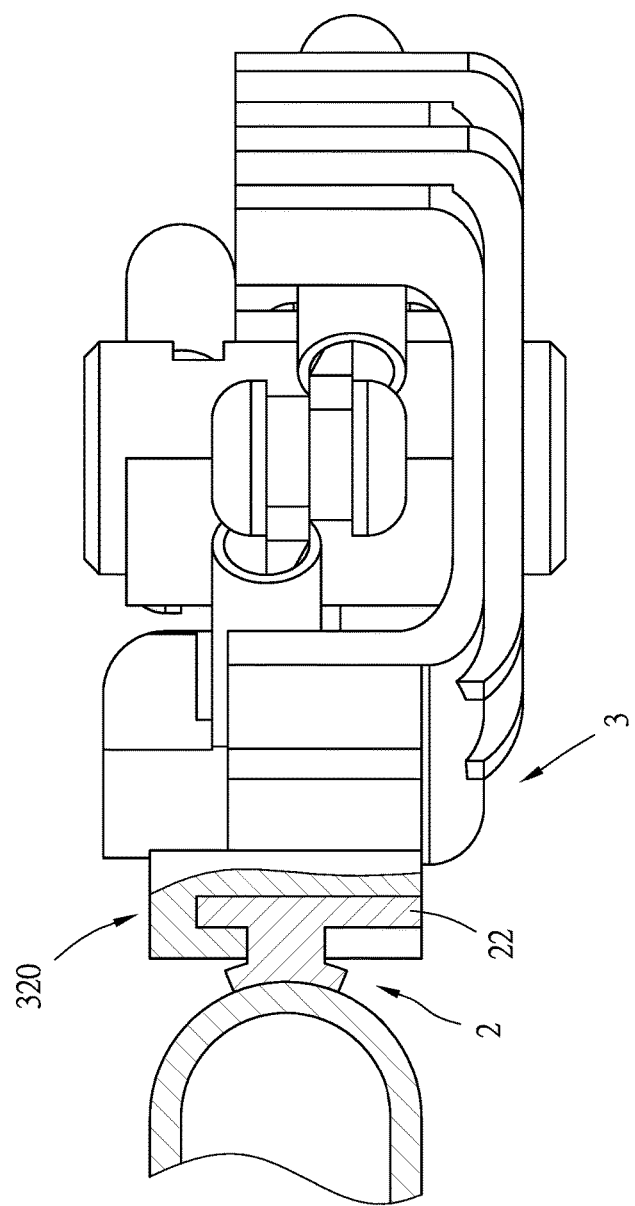
FIG. 7B is a sectional top view showing the embodiment in FIG. 1 mounted on a vehicle frame via the assembly base.
Figure 8B:
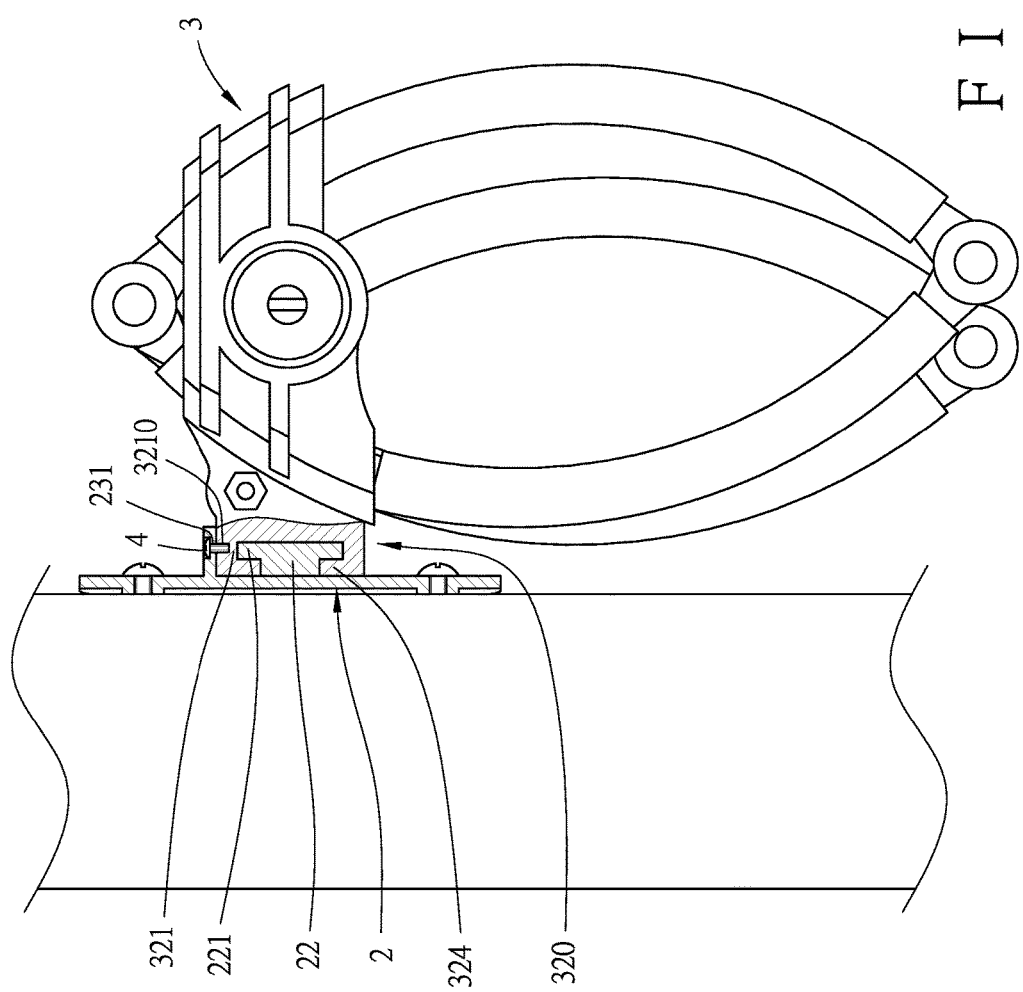
FIG. 8B is a sectional side view showing the embodiment in FIG. 1 mounted on a vehicle frame via the assembly base.

Alternatively, referring to FIG. 5 and FIG. 6, the user may mount the mounting base 3 to a non-cylindrical bar B2 of the vehicle frame B and then place the lock A into the mounting space 315 of the mounting base 3, with the lock cylinder A1 fitted in the fitting portion 311 of the mounting base 3. This mounting process starts by mounting the third coupling portion 21 of the assembly base 2 to the bar B2 via the coupling members 212 (e.g., locking and connecting members). After that, referring to FIG. 7A and FIG. 7B, the sliding groove 323 of the sliding sleeve 320 of the mounting base 3 is mated with the fourth coupling portion 22 (which is implemented as a sliding block in this embodiment) of the assembly base 2 in a sliding manner. Consequently, as shown in FIG. 8A and FIG. 8B, two opposite sides 121 of the fourth coupling portion 22 correspond to the sidewalls 321 of the sliding sleeve 320 respectively, and the fourth coupling portion 22 is blocked by the engaging portions 324 of the linking portion 32. Moreover, the first coupling hole 3210 of the mounting base 3 is aligned with the second coupling hole 231 of the assembly base 2, allowing the fixing member 4 (e.g., a threaded locking member or a pin) to pass through the first coupling hole 3210 and the second coupling hole 231, thereby fixing the mounting base 3 to the assembly base 2 securely.

The embodiment described above is but a preferred one of the present invention and is not intended to be restrictive of the scope of the invention. All simple equivalent variations and modifications made according to the appended claims and the disclosure of this specification should fall within the scope of the invention.

What is claimed is:

1. An adaptable lock mounting device, configured to be mounted with a lock and couple with a vehicle frame, wherein the lock includes a lock cylinder and a keyhole in the lock cylinder, the adaptable lock mounting device comprising:
    a coupling base including a first coupling portion and a second coupling portion, wherein the first coupling portion is a tubular portion configured to be fixedly mounted around a tubular portion of the vehicle frame;
    a mounting base including a lock mounting portion and a linking portion, wherein the lock mounting portion including a fitting portion and an aperture in the fitting portion, the fitting portion is configured to be fitted around the lock cylinder such that the aperture allows access to the keyhole, and each of the linking portion and the second coupling portion of the coupling base is one or the other of a sliding block and a corresponding sliding sleeve to be fitted around the sliding block in order for the mounting base to detachably couple with the coupling base via the linking portion; and
    a fixing member for detachably connecting the mounting base and the coupling base wherein the lock mounting portion includes two position-limiting portions and a lateral portion, the position-limiting portions are located on two sides of the lateral portion respectively and the fitting portion is located on the lateral portion such that a mounting space and an opening are defined between the position-limiting portions and the lateral portion, the mounting space is configured to mount the lock, the opening is formed on the lateral portion to be in communication with the mounting space, and a position-limiting member is movably connected to the lock mounting portion to at least partially cover the opening, wherein the position-limiting member has one end pivotally connected to the mounting base and another end configured to extend over the lock when the lock is positioned in the mounting space to secure the lock in position in the mounting space.

2. The adaptable lock mounting device of claim 1, wherein the second coupling portion is the sliding block, and the linking portion is the sliding sleeve.

3. The adaptable lock mounting device of claim 1, wherein the coupling base has a first coupling hole, the mounting base has a second coupling hole corresponding to the first coupling hole, and the fixing member is configured to pass through the first coupling hole and the second coupling hole.

4. An adaptable lock mounting device, configured to be mounted with a lock and couple with a vehicle frame, wherein the lock includes a lock cylinder and a keyhole in the lock cylinder, the adaptable lock mounting device comprising:
    an assembly base including a first coupling portion and a second coupling portion, wherein the first coupling portion has a plurality of coupling holes through each of which a coupling member can pass in order to be locked to the vehicle frame;
    a mounting base including a lock mounting portion and a linking portion, wherein the lock mounting portion including a fitting portion and an aperture in the fitting portion, the fitting portion is configured to be fitted around the lock cylinder such that the aperture allows access to the keyhole, and each of the linking portion and the second coupling portion of the assembly base is one or the other of a sliding block and a corresponding sliding sleeve to be fitted around the sliding block in order for the mounting base to detachably couple with the assembly base via the linking portion; and
    a fixing member for detachably connecting the mounting base and the assembly base wherein the lock mounting portion includes two position-limiting portions and a lateral portion, the position-limiting portions are boated on two sides of the lateral portion respectively and the fitting portion is located on the lateral portion such that a mounting space and an opening are defined between the position-limiting portions and the lateral portion, the mounting space is configured to mount the lock, the opening is formed on the lateral portion to be in communication with the mounting space, and a position-limiting member is movably connected to the lock mounting portion to at least partially cover the opening, wherein the position-limiting member has one end pivotally connected to the mounting base and another end which is configured to extend over the lock when the lock is positioned in the mounting space to secure the lock in position in the mounting space.

5. The adaptable lock mounting device of claim 4, wherein the second coupling portion is the sliding block, and the linking portion is the sliding sleeve.

6. The adaptable lock mounting device of claim 4, wherein the assembly base has a first coupling hole, the mounting base has a second coupling hole corresponding to the first coupling hole, and the fixing member is configured to pass through the first coupling hole and the second coupling hole.

* * * * *